United States Patent [19]

Mankosa

[11] Patent Number: 5,609,256

[45] Date of Patent: Mar. 11, 1997

[54] PROCESS FOR RECOVERY OF VALUES FROM SOLID WASTE MATERIALS

[75] Inventor: Michael J. Mankosa, Jacksonville, Fla.

[73] Assignee: Carpco, Inc., Jacksonville, Fla.

[21] Appl. No.: 368,536

[22] Filed: Jan. 4, 1995

[51] Int. Cl.$^6$ .................................. B03B 5/00; B03B 7/00
[52] U.S. Cl. .................................. 209/5; 209/12.2; 209/17; 209/172.5; 209/930; 241/24.16; 241/DIG. 38
[58] Field of Search ................... 209/3, 5, 12.1, 209/12.2, 17, 158, 159, 160, 161, 172.5, 173, 930; 366/27, 28, 30, 31, 33, 34, 40; 241/9, 12, 15, 16, DIG. 38, 24

[56] References Cited

U.S. PATENT DOCUMENTS

| | | | |
|---|---|---|---|
| 2,698,087 | 12/1954 | Call et al. | 209/158 |
| 3,622,087 | 11/1971 | Oltmann | 209/10 X |
| 3,970,546 | 7/1976 | Webb et al. | 209/12.2 X |
| 4,249,700 | 2/1981 | Parekh et al. | 209/3 X |
| 4,830,188 | 5/1989 | Hannigan et al. | 209/3 |
| 4,940,187 | 7/1990 | Lee | 209/3 X |

FOREIGN PATENT DOCUMENTS

| | | | |
|---|---|---|---|
| 1585019 | 8/1990 | U.S.S.R. | 209/12.1 |
| 2198662 | 6/1988 | United Kingdom | 209/12.1 |

*Primary Examiner*—William E. Terrell
*Assistant Examiner*—Tuan Nguyen
*Attorney, Agent, or Firm*—Arthur G. Yeager

[57] ABSTRACT

Process for separating valuable solid materials from a mixture of waste scrap materials by adding water and sand to a volume of scrap, such as chopped insulated wire, to obtain a feed of about 70–80% solids by weight; subjecting the feed mixture to vigorous agitation; screening out large foreign materials; subjecting the screened mixture to a dense medium separation with the introduction of water to produce a fluidized bed in the separation zone; removing light stream from the separation zone and screening to recover insulation material particles; and removing a heavy stream from the separation zone and screening to recover metallic particles.

20 Claims, 1 Drawing Sheet

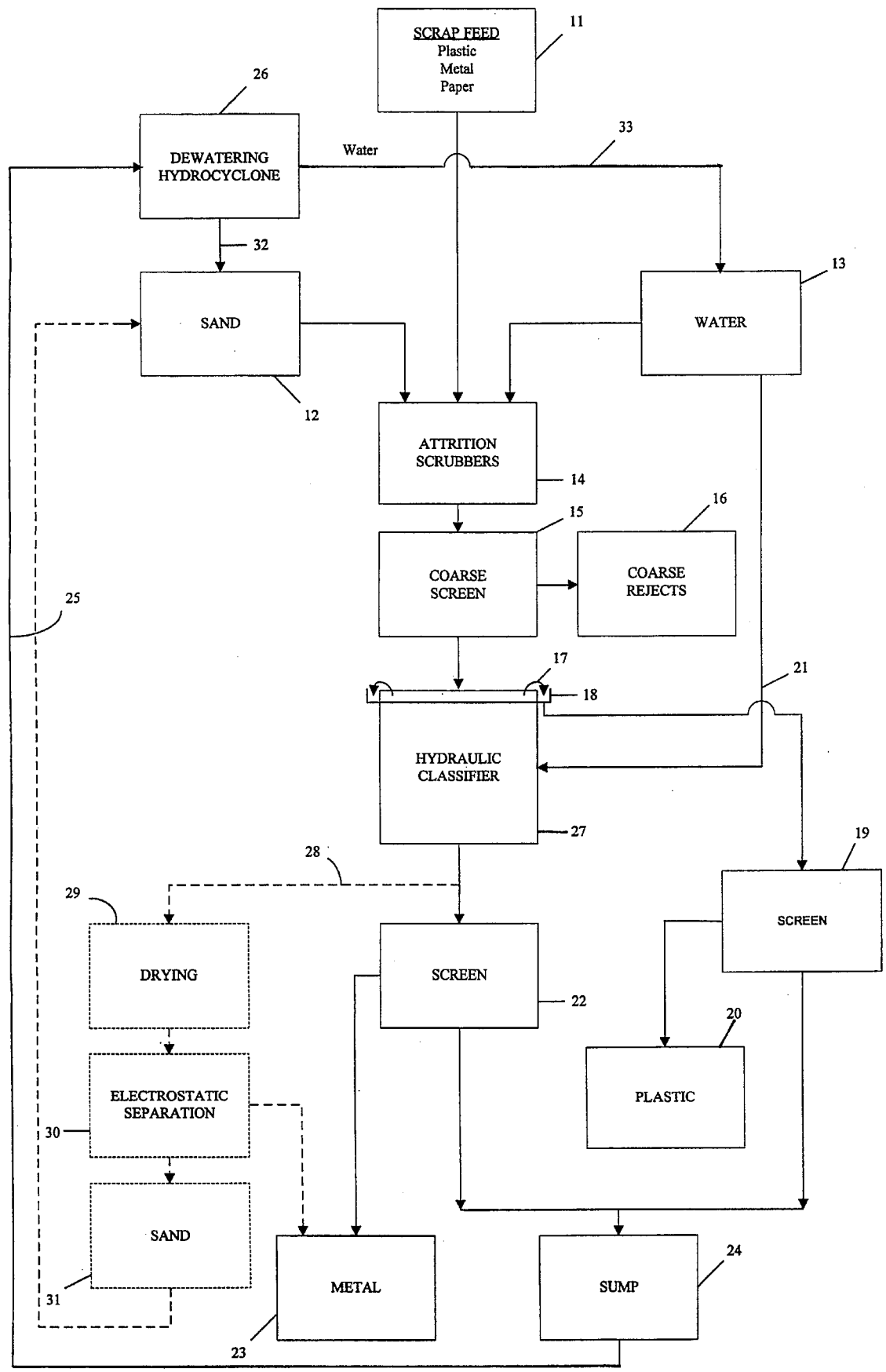

PROCESS FOR RECOVERY OF VALUES FROM SOLID WASTE MATERIALS

FIELD OF THE INVENTION

This invention is in the technical field of separation of solid materials.

BACKGROUND OF THE INVENTION

The recent emphasis placed on recycling of industrial products has created a need for new separation technologies in the recycling industry. This is particularly true for the scrap metal industry. Predominant areas of interest include iron and steel, aluminum and copper. Unlike the others, copper presents a somewhat more challenging problem since a significant by-product (plastic insulation) is generated by the recycling of scrap wire.

Current practice for recovery of copper from used or scrap wire involves shredding followed by screening to separate the wire from the plastic insulation. Although this approach is quite effective at recovering 80–90% of the wire, a substantial portion of copper and/or aluminum is lost with the plastic reject material. This is a result of inefficiencies in both the shredding and screening procedures.

More recently, standard mineral processing separation procedures have been applied to recover the misplaced wire. This approach involves the use of electrostatic separation to recover the lost metallics from the plastic reject stream. Unfortunately, this technique is only applicable to dry, free-flowing material. As a result, separation of material which has been stock-piled outdoors for an extended period of time is not feasible.

The incentive to develop a new process for recovery of valuable metallics from stock-piled waste is two-fold. First, and most important, the exposure of heavy metals, such as copper, to weathering conditions creates an environmental hazard with regard to ground water contamination. This hazard also eliminates landfilling as an alternative for disposal of the waste plastics. Second, the amount of metallics present in these stock-piles represents a substantial source of income, if this material can be effectively recovered. Likewise, the potential also exists to generate a clean plastic by-product which may be marketable.

It is an object of this invention to provide a novel process for the recovery of plastic and of metal from waste scrap containing these two values. It is another object of this invention to provide a novel process for stripping plastic insulation material from waste scrap wire and for recovering the metal values and the insulation material values as separate, substantially pure products. Still other objects will appear from the following detailed description.

BRIEF SUMMARY OF THE INVENTION

This invention relates to a process for separating insulation material and metal material from a raw particulate scrap feed stock of chopped insulated wire which comprises:

(a) adding to the scrap feed stock sufficient water and sand to produce a slurry having 25–90% by weight solids;

(b) subjecting the slurry to high shear agitation to disperse the particle size of the solids and separates various components of the solids in the slurry;

(c) screening the agitated slurry to remove all particles greater than about 25 mm. in size;

(d) subjecting the screened and agitated slurry to a dense medium separation in a zone wherein the medium has a density of about 1.1–2.0 g/cc with water being introduced upwardly into the zone;

(e) recovering a lower density product stream from the upper portion of the zone and a higher density product stream from the lower portion of the zone;

(f) separating and recovering insulation particles from the lower density product; and (g) separating and recovering metal particles from the higher density product stream.

In specific and preferred embodiments of the invention the insulation material is plastic and the metal is copper. In other preferred procedures, the dense medium separation includes the formation of a fluidized bed having a density of 1.1–2.0 g/cc and from which insulation particles rise upwards through the bed and metallic particles sink downward through the bed. A continuous process for the separation is preferred with recovery of materials used in the process.

BRIEF DESCRIPTION OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

FIG. 1 is a block flow diagram of the process of this invention for treating a scrap feed of chopped strands of plastic insulated wire to recover relatively pure metal as one product and relatively pure plastic as a second product and recovery of the materials used in the process.

BRIEF DESCRIPTION OF THE INVENTION

The invention is a process which is believed to be a novel combination of process steps which may or may not employ well known machinery to accomplish those steps. One of the novel factors of this process is that it accepts as feed material a waste mixture that may be contaminated with other trash and/or wet from atmospheric rain or dampness. Many other processes require a preliminary cleanup or a drying step, whereas this process accepts the waste in an "as-is" basis. In the case of scrap electric wiring the waste particles may include paper or fibrous layers, which form part of the insulation, as well as the outer layer of plastic or rubbery material.

It is preferable that the scrap feed be particles of not more than about 1.0 inch in maximum dimension, and, therefore, in some instances, the scrap stockpile may be pretreated to size reduction to eliminate long lengths of scrap wire.

The scrap feed 11 is fed into an attrition scrubbing zone 14 along with sand feed 12 and water feed 13. The respective amounts of these components is such that a final water/sand/scrap slurry of about 25%–90% by weight solids is scrubbed. A preferred solids content is about 70–80%. The scrubbing operation is an intense agitation, e.g., by attrition scrubbers, which usually includes two or more large diameter propeller/agitators (10–18 inches), oppositely pitched and operating at moderate speeds. This agitation shreds any paper or fibrous material, breaks up the insulation and removes it and disperses the particulates throughout the slurry. Any machine or procedure that provides intense shear agitation is suitable for this step. Sand is important in that it provides enhanced cutting and shearing action needed to accomplish the shredding and dispersing.

The material leaving the attrition scrubbing zone 14 is passed through a coarse screen, e.g., openings of about 0.5–1.0 inch, to remove large reject matter (rocks, glass, etc.) from the treated stream, which is then subjected to a "dense medium" separation step. Such a step refers to separation of values (e.g., metals or plastic) by passing the raw material through a medium having selected density intermediate the densities of the metal and of the plastic such that most plastic values will rise while most metal values will sink in that medium, thus producing a separation between the materials having different densities. This procedure is also sometimes called "hydraulic classification". The separation may be accomplished in machines such as the commonly available "Floatex" classifier or the Linatex "Hydrosizer". In general this step involves feeding a material, such as the screened product of attrition scrubbing 14 after removal of large or coarse rejects 16, into classification zone 27 and allowing it to separate while feeding water 21 into zone 27 and adjusting the flows so that an overflow 17 of plastic, sand and water is produced. In the middle of zone 27 there is formed a fluidized bed of water and sand, which bed has an apparent density of about 1.1–2.0 grams/cubic centimeter. Some particles from the scrap feed will rise through this fluidized bed toward overflow 17 because those particles have a buoyancy (i.e., a density less than that of the fluidized bed); and other particles will sink through that bed to the lower regions of classification zone 27 because their density is greater than that of the bed. Adjustment of the upward flow of water 21 and the incoming screened and scrubbed feed will stabilize the fluidized bed in zone 27. Overflow stream 17 is caught in launder trough 18 and fed to a screen 19, where the desired light weight components, e.g., plastic insulation particles are retained on screen 19 and recovered for storage at 20. Passing through screen 19 is a mixture of water and sand that overflowed at 17. The water and sand is directed to a sump 27 and then pumped to a dewatering cyclone 26. The heavy components (principally metal particles, e.g., copper) are drained from the lower region of classification zone 27 and screened at 22 to remove metal values for storage at 23 and the water and sand is directed to sump 24.

For efficient and continuous operation water 33 and sand 32 from dewatering step 26 are recycled to feed components 13 and 12, respectively for reuse, and the water 33 from 26 may be recycled for use at 21.

An alternative step for recovery of the metal values is shown in dotted lines wherein the heavy component outlet from classification step 27, which contains metal, sand, and water is fed to a drying step 29 to remove water and produce a dry sand/metal product which is fed to an electrostatic separator 30 where metal particles are removed to storage at 23 and sand is removed and recycled to starting material 12. Water may be recovered from drying step 26 and recycled through line 33 to either of water supply 13 or water inlet 21.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A continuous process for separating insulation material and metal material from a raw particulate scrap feed stock of chopped insulated wire which comprises:
   (a) adding to said scrap feed stock sufficient water and sand to produce a slurry having 25–90% by weight solids;
   (b) subjecting said slurry to high shear agitation to disperse the various components of the solids throughout said slurry;
   (c) screening said agitated slurry to remove all particles greater than about 25 mm. in size;
   (d) subjecting said screened and agitated slurry to a dense medium separation in a zone wherein said medium has a density of about 1.1–2.0 grams/cubic centimeter with water being introduced upwardly into the zone;
   (e) recovering a lower density product stream from the upper portion of said zone and a higher density product stream from the lower portion of said zone;
   (f) separating and recovering insulation particles from said lower density product; and
   (g) separating and recovering metal particles from said higher density product stream.

2. The process of claim 1 wherein said dense medium separation includes a fluidized bed of water and sand into which said screened agitated slurry is fed.

3. The process of claim 1 wherein said lower density product stream consists essentially of plastic particles, water and sand.

4. The process of claim 1 wherein said higher density product stream consists essentially of metal particles, water and sand.

5. The process of claim 1 wherein step (g) includes drying said stream and separating the metal therefrom by electrostatic separation means.

6. The process of claim 1 wherein steps (f) and (g) both include separate operations of screening to separate plastic particles or metal particles, respectively, from water and sand.

7. The process of claim 1 which additionally includes:
   (h) recovering sand and water from the separation step (g) and recycling said sand and water to step (a).

8. The process of claim 1 wherein said insulation material is plastic or rubber.

9. A continuous process for separating plastic material and metal material from a particulate scrap feed stock of chopped insulated wire which comprises:
   (a) subjecting said scrap feed stock mixed with sufficient water and sand to produce an attrition slurry of 25% to 90% by weight solids to produce a scrubbed feed stock;
   (b) screening said scrubbed feed stock to remove particles larger than about 25 mm. to produce a screened, scrubbed feed stock;
   (c) subjecting said screened, scrubbed feed stock to a zone of hydraulic classification wherein a said feed stock is fluidized by an upwardly flowing stream of water to produce an overhead light density product and a heavy density tail product;
   (d) screening said overhead product to separate a first product of plastic particles from a first mixture of water and sand;
   (e) screening said tail product to separate a second product of metal particles from a second mixture of water and sand;

(f) combining said first and second mixtures of water and sand and removing some water from said combination; and (g) recycling the dewatered combination of step (f) to step (a) to be mixed with untreated scrap feed stock to be subjected to attrition scrubbing.

10. The process of claim 9 wherein said fluidized feed stock has an effective density of about 1.1–2.0 grams/cubic centimeter.

11. The process of claim 9 wherein said overhead product is removed from said classification at an elevation above the middle of said zone.

12. The process of claim 9 wherein said some water from step (f) is recycled in the process.

13. The process of claim 9 wherein said some water from step (f) is recycled to step (a).

14. The process of claim 9 wherein said some water from step (f) is recycled to step (c).

15. A continuous process for separating plastic material and metal material from a particulate scrap feed stock of chopped insulated wire which comprises:

(a) subjecting said scrap feed stock mixed with sufficient water and sand to produce a slurry of 25% to 90% by weight solids to produce an attrition scrubbed feed stock;

(b) screening said scrubbed feed stock to remove particles larger than about 25 mm. to produce a screened, scrubbed feed stock;

(c) subjecting said screened, scrubbed feed stock to a zone of hydraulic classification wherein said feed stock is fluidized by an upwardly flowing stream of water to produce an overhead light density product and a heavy density tail product;

(d) screening said overhead product to separate a first product of plastic particles from a first mixture of water and sand;

(e) drying said tail product;

(f) electrostatically separating the metal from the sand;

(g) removing some water from said first mixture of water and sand;

(h) recycling the dewatered sand from step (g) to step (a) to be mixed with untreated scrap feed stock to be subjected to attrition scrubbing.

16. The process of claim 15 wherein said fluidized feed stock has an effective density of about 1.1–2.0 grams/cubic centimeter.

17. The process of claim 15 wherein said overhead product is removed from said classification at an elevation above the middle of said zone.

18. The process of claim 15 wherein said some water from step (g) is recycled in the process.

19. The process of claim 15 wherein said some water from step (g) is recycled to step (a) .

20. The process of claim 15 wherein said some water from step (g) is recycled to step (c).

\* \* \* \* \*